US012762225B2

(12) United States Patent
Uretzky et al.

(10) Patent No.: US 12,762,225 B2
(45) Date of Patent: Oct. 13, 2026

(54) TRAINING DATA POISONING DETECTION

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL); Amir Idar, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 18/816,039

(22) Filed: Aug. 27, 2024

(65) Prior Publication Data

US 2026/0064831 A1 Mar. 5, 2026

(51) Int. Cl.
*G06F 21/55* (2013.01)

(52) U.S. Cl.
CPC .................................... *G06F 21/55* (2013.01)

(58) Field of Classification Search
None
See application file for complete search history.

(56) References Cited

U.S. PATENT DOCUMENTS

| | | | | |
|---|---|---|---|---|
| 11,354,602 | B2 * | 6/2022 | Kursun | H04L 63/1433 |
| 2019/0251479 | A1 * | 8/2019 | Anderson | H04L 63/1466 |
| 2020/0019821 | A1 * | 1/2020 | Baracaldo-Angel | G06F 18/10 |
| 2021/0081831 | A1 * | 3/2021 | Angel | G06V 10/771 |
| 2021/0144167 | A1 * | 5/2021 | Glukhov | H04L 63/1425 |
| 2021/0256420 | A1 * | 8/2021 | Elisha | G06N 20/00 |
| 2021/0374247 | A1 * | 12/2021 | Sultana | G06F 21/57 |
| 2022/0044133 | A1 * | 2/2022 | Otto | G06N 5/04 |
| 2023/0126260 | A1 * | 4/2023 | Elsakhawy | H04L 41/16<br>709/224 |
| 2023/0308401 | A1 * | 9/2023 | Sesha | H04L 49/3009 |
| 2025/0077954 | A1 * | 3/2025 | Ezrielev | G06N 20/00 |
| 2025/0077955 | A1 * | 3/2025 | Ezrielev | G06N 20/00 |

OTHER PUBLICATIONS

Jai Pradeesh, Adversarial Attacks on AI Systems, Jul. 27, 2023 (6 pages).
Kate Baroni, Microsoft, Six Security Considerations for Machine Learning Solutions, Jan. 18, 2023 (9 pages).

* cited by examiner

*Primary Examiner* — Christopher C Harris
(74) *Attorney, Agent, or Firm* — Trop, Pruner & Hu, P.C.

(57) ABSTRACT

In some examples, a system receives a plurality of training samples of a training data set for a machine learning model, where each training sample of the plurality of training samples comprises a plurality of features. The system determines quantities of changes made to respective features of the plurality of features, computes a score representing an integrity of the training data set based on the quantities, and detects poisoning of the training data set based on the score.

18 Claims, 4 Drawing Sheets

TRAINING DATA POISONING DETECTION

BACKGROUND

Artificial intelligence is increasingly being used in computing environments to drive efficiency and innovation in the delivery of services and/or products. Artificial intelligence exhibited by machines relies on use of machine learning models that can learn from a knowledge base, which can be based on any or some combination of the following: data from past activities, training data, or data from other sources.

BRIEF DESCRIPTION OF THE DRAWINGS

Some implementations of the present disclosure are described with respect to the following figures.

Figure 1:
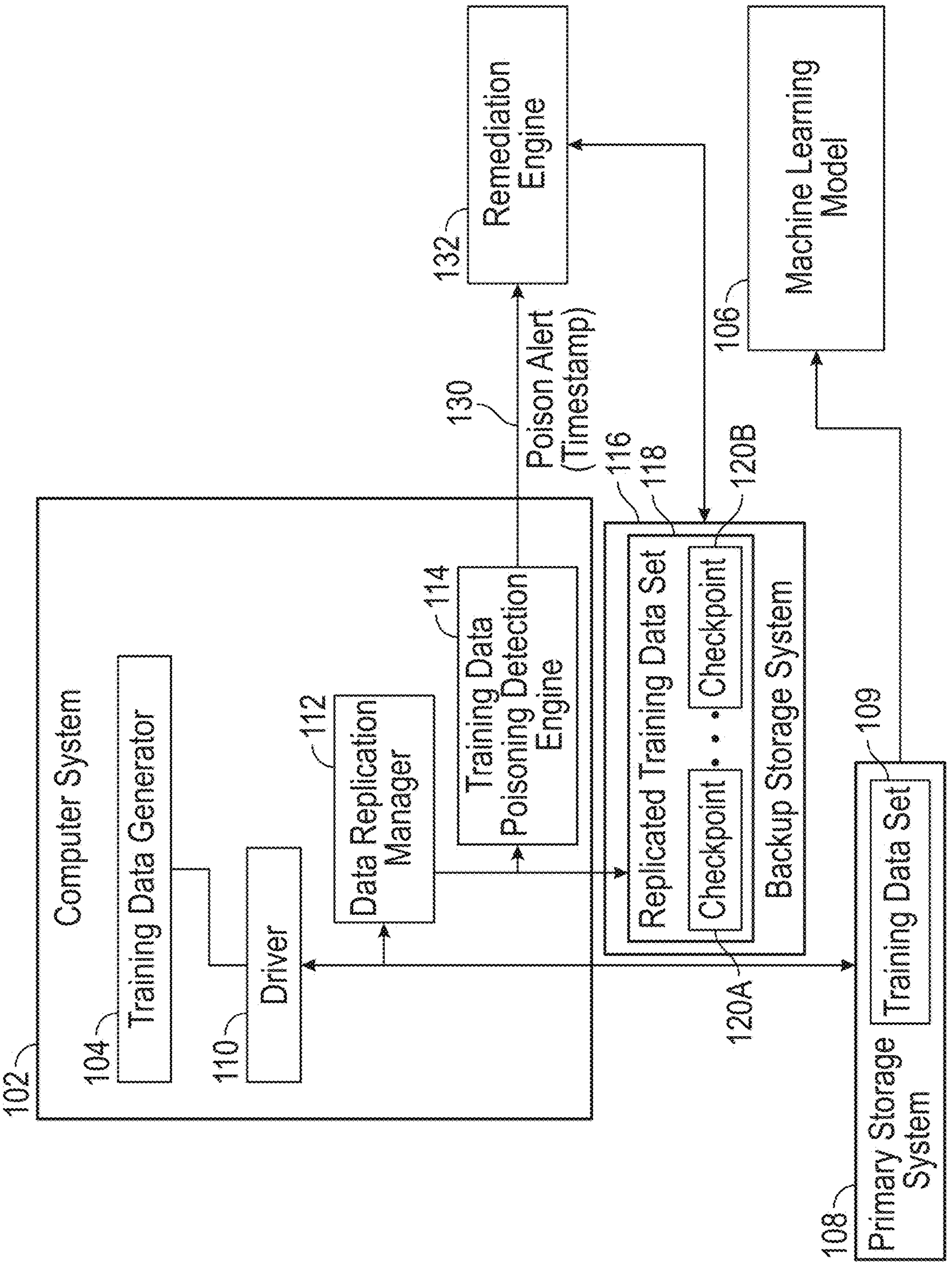
FIG. 1 is a block diagram of a computer system including a training data poisoning detection engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A training data set can be used to train a machine learning model to make predictions. A training data set includes training samples, where a "sample" can refer to a data record having values of respective attributes. The attributes are also referred to as features of a sample. The training samples of a training data set may include labeled training samples, where a collection of features of each given sample is assigned a label (selected from multiple labels) corresponding to the collection of features. For example, a first collection of features in a first training sample may include values that collectively indicate that an attack is occurring with respect to a computing environment. As a result, a first label (e.g., an "attack detected" label) may be assigned to the first collection of features of the first sample. On the other hand, a second collection of features in a second training sample may include values that collectively indicate that an attack is not occurring with respect to the computing environment. In this latter case, a second label (e.g., an "attack not detected" label) may be assigned to the second collection of features of the second sample. In other contexts, training samples may be assigned other labels.

An attacker (e.g., a human, malware, or a machine) may seek to influence predictions made by a machine learning model by modifying a training data set used to train the machine learning model. Such a modification of the training data set results in poisoning of the training data set. The machine learning model trained on the poisoned training data set will produce outputs that are inaccurate, e.g., the machine learning model may produce an output predicting that an attack is not detected in a computing environment when in fact an attack is occurring. Wrong outputs produced by the machine learning model can result in security breaches that may compromise the integrity of the computing environment, compromise the data stored in the computing environment, or allow theft of data to occur. Training data sets can also be poisoned due to other causes, such as due to data errors or faults in operations of machines or programs that produce the training data sets. As used here, "poisoning" of training data refers to any modification of the training data (whether intentional or unintentional) that causes a machine learning model to produce inaccurate outputs based on an input data set.

In accordance with some examples of the present disclosure, techniques or mechanisms are provided to detect poisoning of a training data set used to train a machine learning model, based on one or more of the following: quantities of changes made to respective features in training samples of the training data set, and quantities of outliers in values of the respective features in the training samples. Based on the foregoing quantities, a score is computed that represents an integrity of the training data set based on the quantities. The score is used to detect poisoning of the training data set.

FIG. 1 is a block diagram of an example arrangement that includes a computer system 102 that includes a training data generator 104 that creates or updates training data for a machine learning model 106. The computer system can be implemented with one or more computers. The machine learning model 106 can be executed in a computer system separate from the computer system 102, or alternatively, the machine learning model 106 may be executed in the computer system 102.

The training data generator 104 can be implemented with machine-readable instructions executed by a processing resource in the computer system 102. Alternatively or additionally, the training data generator 104 can be implemented with hardware processing circuits. Also, a source of training data for the machine learning model 106 can include an external source outside the computer system 102, such as a human, a program, or a machine. The external source can create or update training data for the machine learning model 106.

Training data (generated by the training data generator 104 and/or an external source) can be written to a primary storage system 108 including one or more storage devices. The training data generator 104 and/or the external source can issue write requests for writing the training data. The write requests are handled by a driver 110 in the computer system 102. In response to the write requests, the driver 110 issues write transactions to write the training data into a training data set 109 in the primary storage system 108.

The training data set 109 can be according to a specified format, such as any of the following: a columnar data file format (e.g., a format of relational tables in Structured Query Language (SQL) databases), a tabular data file format, (e.g., an Excel format, a comma separated value (CSV) format, etc.), a nested file format (e.g., an extensible Markup Language (XML) format, a JavaScript Object Notation (JSON) format, etc.), or any other format.

The training data set 109 is used to train the machine learning model 106. The machine learning model 106 once trained can recognize patterns in input data. The machine learning model 106 produces outputs representing predictions made by the machine learning model 106 based on the input data. The outputs of the machine learning model 106 are used by one or more consumers to perform various actions. A consumer of the outputs of the machine learning model 106 can include a user, a program, or a machine.

The driver 110 is a program that manages access to the primary storage system 108. In some examples, the driver 110 is part of an operating system (OS). In other examples in which a virtual computing environment is implemented in the computer system 102, the driver 110 can be part of a virtualization management program, such as a hypervisor or a container engine. The hypervisor creates and manages virtual machines (VMs) in the computer system 102. The container engine that creates and manages containers in the computer system 102.

In some examples, the computer system 102 further includes a data replication manager 112 and a training data poisoning detection engine 114. Each of the data replication manager 112 and the training data poisoning detection engine 114 can be implemented with machine-readable instructions executable on the processing resource of the computer system 102. In other examples, the data replication manager 112 and the training data poisoning detection engine 114 can be implemented using one or more hardware processing circuits.

The data replication manager 112 replicates data writes to a backup storage system 116 including one or more storage devices. In some examples, the backup storage system 116 is outside the computer system 102. In other examples, the backup storage system 116 may be inside the computer system 102. The primary storage system 108 is to store training data (e.g., the training data set 109) for application to the machine learning model 106. The backup storage system 116 is to store a replication of the training data for use in recovery of the training data.

The backup storage system 116 may be physically separate from the primary storage system 108. Alternatively, the backup storage system 116 may be part of the same physical storage infrastructure but logically separate from the primary storage system 108.

Input/output (I/O) operations between the driver 110 and the primary storage system 108 can include read I/O operations and write I/O operations. The data replication manager 112 is able to detect the write I/O operations, and replicate the write I/O operations to the backup storage system 116. A "replication" of a data write can refer to storing a representation of a write I/O operation in the backup storage system 116. The representation of the write I/O operation can include changed data (e.g., new data, or modified data, or deleted data). The representation of the write I/O operation can also include information of the type of write operation, such as an insert operation to add new data, an update operation to modify data, or a delete operation to delete data.

Replication of data writes of training data results in storing a replicated training data set 118 in the backup storage system 116. The replicated training data set 118 includes checkpoints 120A to 120B that correspond to different time points. A "checkpoint" in the replicated training data set 118 includes a version of training data at a respective time point. Different checkpoints in the replicated training data set 118 can be created at different time points. A checkpoint in the replicated training data set 118 can be used to recreate training data in the training data set 109 in case any part of the training data set 109 is lost or poisoned.

The training data poisoning detection engine 114 can be applied on replicated training data as the replicated training data is being written to the backup storage system 116. The training data poisoning detection engine 114 applies its analysis on an input collection of training samples that are written to the replicated training data set 118. The input collection of training samples on which the training data poisoning detection engine 114 applies its analysis can include training samples within a specified time interval, such as a time window of a specified length. The time window has a range that starts at T1 and ends at T2, where T2 can be the current time and T1 and T2 define the specified length. In such examples, the training data poisoning detection engine 114 applies its analysis on a most recent time window, which is a moving time window that shifts with the current time. In other examples, the input collection of training samples can be selected in a different way. For example, the training samples may be randomly selected as the replicated training data is written to the backup storage system 116.

Each training sample includes a collection of features and a label that is assigned for the collection of features. The label may be assigned by a human, a program, or machine. Features of a training sample can include numeric features and/or categorical features. A numeric feature is assigned numeric values from a range of numeric values, while a categorical feature is assigned a categorical value from a discrete set of categorical values.

The training data poisoning detection engine 114 can perform "real-time" detection of training data poisoning. Real-time detection of training data poisoning is based on the training data poisoning detection engine 114 analyzing training samples in replicated training data as the data replication manager 112 writes the replicated training data to the backup storage system 116.

If the training data poisoning detection engine 114 detects potential poisoning of training data in the input collection of training samples, the training data poisoning detection engine 114 issues a poison alert 130, which can be in the form of a message, an information element, or any other type of indicator. The poison alert 130 indicates that the training data set 109 used by the machine learning model 106 is poisoned. The poison alert 130 can include a timestamp representing a time at which the potential poisoning of training data was detected.

The poison alert 130 is sent by the training data poisoning detection engine 114 to a remediation engine 132, which can take a remediation action in response to the poison alert 130. Examples of remediation actions can include any of the following: issue an alert to a target entity (e.g., a human administrator, a program, or a machine), disable the machine learning model 106, disable a computer system in which the machine learning model 106 executes (such as by shutting down the computer system), disabling a network connectivity of the computer system in which the machine learning model 106 executes, or any other remediation action.

Additionally, the remediation engine 132 can retrieve a checkpoint (e.g., 120A or 120B) from the replicated training data set 118 to use in recovering the poisoned training data set 109 to a prior state. The retrieved checkpoint was created prior to the timestamp included in the poison alert 130. Because the poison alert 130 was generated by the training data poisoning detection engine 114 based on real-time detection of training data poisoning, the timestamp in the poison alert 130 is likely to represent the approximate time at which poisoning of the training data set 109 occurred. Thus, a checkpoint created prior to the timestamp (or some threshold time interval before the timestamp) of the poison alert 130 is likely to include unpoisoned training data.

The training data poisoning detection engine 114 can raise the poison alert 130 based on one or more criteria. A first criterion relates to whether a training sample (which may be a new or modified training sample) conforms to a schema of the training data (referred to as "training data schema"). The format of the training data can be defined by the training data schema. For example, the training data schema specifies what features are included in each training sample, and the possible values (e.g., range of values or set of categorical values) of each feature.

If the training data poisoning detection engine 114 detects that a training sample (or some specified quantity of training samples) in the input collection of training samples does not conform to the training data schema, then it is likely that the training sample has been tampered with and thus the training data poisoning detection engine 114 raises the poison alert 130.

A second criterion relates to whether training samples were deleted completely. In most cases, deleting a training sample completely may be a legitimate action. For example, training samples may be deleted as part of data cleaning. As a result, deletions of training samples would not cause the training data poisoning detection engine 114 to raise the poison alert 130.

A third criterion relates to whether features of a subset (less than all) training samples in the input collection of training samples have been modified. Changing individual features of a training sample may potentially be associated with an attack of the training data, especially if the changes are to features of some training samples but not other training samples. Note that changing values of an individual feature (or a subset of features) of all training samples in the input collection of training samples may be considered a legitimate action. For example, the values of an individual feature (or subset of features) of all training samples in the input collection of training samples may be changed as part of a data scaling operation or data transformation operation. Thus, changes in values of an individual feature (or a subset of features) of all training samples in the input collection of training samples would not cause the training data poisoning detection engine 114 to raise the poison alert 130. However, changes to values of features in some training samples but not in other training samples of the input collection of training samples would be considered by the training data poisoning detection engine 114 as indicative of training data poisoning.

More generally, changes in values of an individual feature (or a subset of features) of greater than a threshold quantity of training samples in the input collection of training samples would not cause the training data poisoning detection engine 114 to raise the poison alert 130. However, changes to values of features in some training samples (less than the threshold quantity) but not in other training samples of the input collection of training samples would be considered by the training data poisoning detection engine 114 as indicative of training data poisoning. The threshold quantity can be based on some relative percentage (e.g., 99%, 95%, 90%, 80%, etc.) of the total quantity of training samples in the input collection of training samples. In other examples, the third criterion relates to determining if changes to training samples are consistent with a target pattern of changes due to common or expected data transformations that may be applied to the training samples. If the changes are not consistent with the target pattern, that may be indicative of training data poisoning.

A further issue to consider is that some features of training samples may be categorical or even textual, and those features may also be transformed. An example transformation for a categorical feature is from {−1, 1} to {0, 1} in preparation for some machine learning models, or label encoding (e.g., "Red"→0, "Green"→1, "Blue"→2). Thus, non-numerical features can either be ignored, or checked for no changes after a data preparation stage in which the non-numerical features may be transformed.

A fourth criterion relates to whether features of training samples in the input collection of training samples have values that are outliers, and the presence of these outliers meet one or more specified conditions. In some examples, an outlier refers to a value of a feature that falls outside an expected set of values based on a distribution of values of the feature, where the distribution of values may be based on observed values of the feature. The "observed" values of the feature can refer to the values of the feature within the input collection of training samples, or alternatively, to values of the feature within a larger set of training samples (such as a historical set of training samples). In other examples, an outlier may be statistically determined. For example, a value of a feature is considered an outlier if the value is more than a specified number of standard deviations from the mean of observed values of the feature. The presence of outliers satisfying the conditions below may suggest the injection of synthetic or manipulated data. A first condition relates to whether there is an increase in the number of outliers following an edit of the training data. If this first condition is met, that may be indicative of training data poisoning. A second condition relates to whether the variance of values of outliers deviate from a previous standard deviation. If this second condition is met, that may be indicative of training data poisoning.

Figure 2:
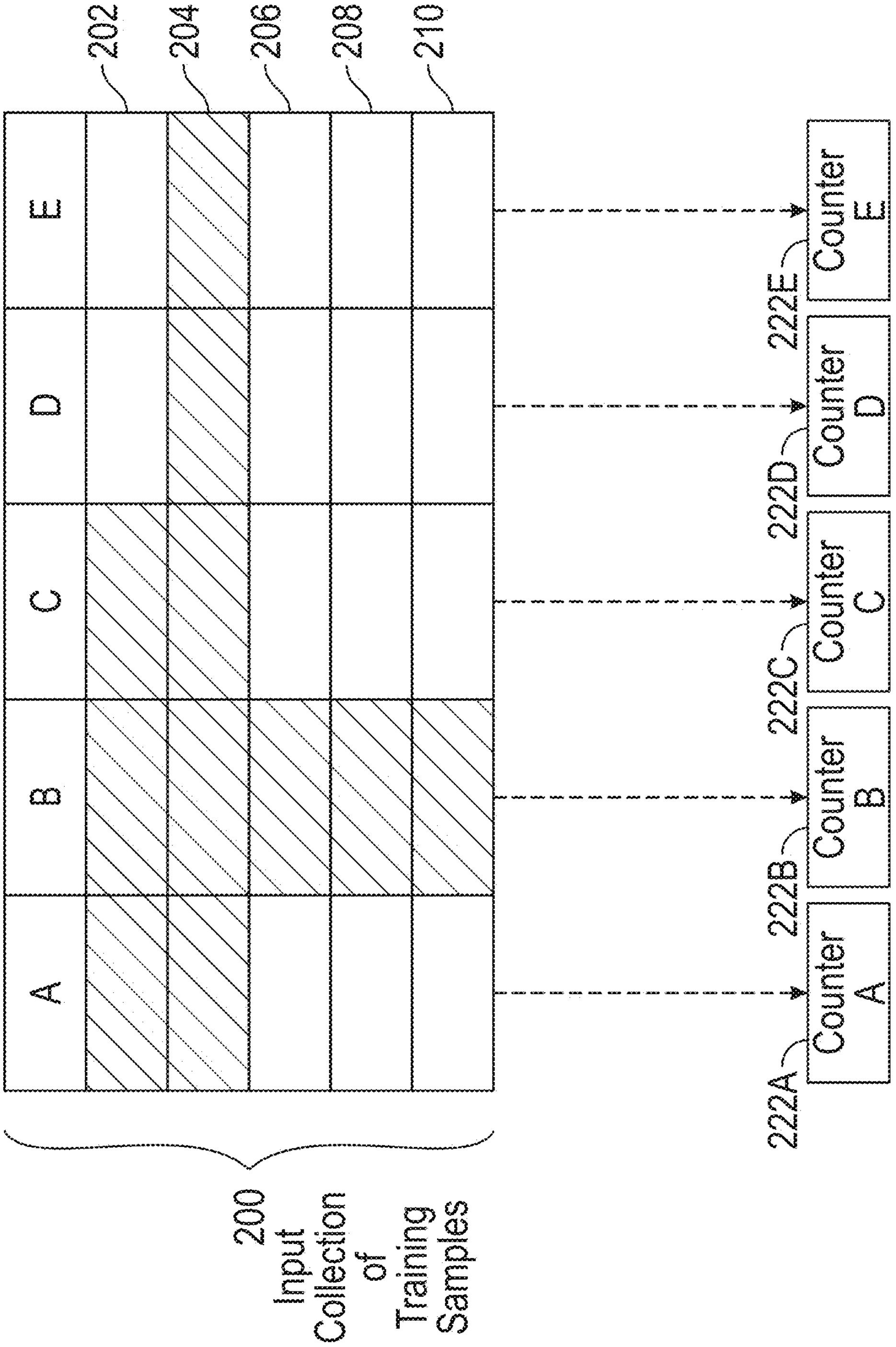
FIG. 2 is a block diagram showing an input collection of training samples and counters for tracking changes to features in the training samples, according to some examples.

FIG. 2 is a block diagram of an input collection of training samples 200, where each training sample has features A, B, C, D, and E. The input collection of training samples 200 includes 5 training samples 202, 204, 206, 208, and 210. A shaded cell in the input collection of training samples 200 indicates a change in the value of a feature, such as due to a write that adds a new value or modifies an existing value of the feature. Although FIG. 2 shows an example in which the input collection of training samples 200 has 5 training samples, in other examples, the input collection of training samples 200 can have a different quantity of training samples. Also, in other examples, a training sample can have a smaller or larger different quantity of features than shown in FIG. 2.

Each of features A to E is associated with a respective counter. For example, feature A is associated with a counter 222A, feature B is associated with a counter to 222B, feature C is associated with a counter 222C, feature D is associated with a counter 222D, and feature E is associated with a counter 222E. Each counter tracks a count of how many changes have been made to the respective feature across the training samples in the input collection of training samples 200. Thus, the counter 222A tracks the quantity of changes made to feature A in the training samples 202, 204, 206, 208, and 210. In the example of FIG. 2, the values of feature A are changed in the training samples 202 and 204. As a result, the counter 222A has incremented to 2 to represent the two changes made.

The counter 222B tracks the quantity of changes made to feature B in the training samples 202, 204, 206, 208, and 210. In the example, the values of feature B are changed in all the training samples 202, 204, 206, 208, and 210. As a result, the counter 222B has incremented to 5 to represent the five changes made.

The counter 222C tracks the quantity of changes made to feature C in the training samples 202, 204, 206, 208, and 210. In the example, the values of feature C are changed in the training samples 202 and 204. As a result, the counter 222C has incremented to 2 to represent the two changes made.

The counter 222D tracks the quantity of changes made to feature D in the training samples 202, 204, 206, 208, and 210. In the example, the value of feature D is changed in the training sample 204. As a result, the counter 222D has incremented to 1 to represent the one change made.

The counter 222E tracks the quantity of changes made to feature E in the training samples 202, 204, 206, 208, and 210. In the example, the value of feature E is changed in the training sample 204. As a result, the counter 222E has incremented to 1 to represent the one change made.

As noted above, according to the third criterion, changing an individual feature of all training samples in the input collection of training samples may be considered a legitimate action. In the example of FIG. 2, since the counter 222B has incremented to 5 for the input collection of training samples that has 5 training samples, the changes to feature B can be ignored by the training data poisoning detection engine 114. In other words, the value of the counter 222B can be disregarded by the training data poisoning detection engine 114 in computing a score relating to whether training data poisoning has occurred.

The following describes an example of how the score is computed by the training data poisoning detection engine 114. The following parameters are defined.

A parameter N_Samples represents a total quantity of training samples in an input collection of training samples. For FIG. 2, N_Samples =5.

A parameter $C_i$ represents a count of changes made to feature i. For example, for FIG. 2, $C_A$=2 for feature A, $C_C$=2 for feature C, $C_D$=1 for feature D, and $C_E$=1 for feature E. Note that the count $C_B$=5 for feature B is disregarded since the values of feature B have been changed in all training samples of the input collection of training samples 200. Disregarding the count $C_B$ for feature B can be accomplished in one of two ways. First, the count $C_B$ can be excluded from Eq. 1 below. Second, the count $C_B$ can be set to 0 and included in Eq. 1.

A parameter $L_i$ represents a quantity of outliers for feature i. $L_A$ represents a quantity of outliers for feature A, $L_C$ represents a quantity of outliers for feature C, $L_D$ represents a quantity of outliers for feature D, and $L_E$ represents a quantity of outliers for feature E. In some examples, $L_i \leq C_i$.

In an example, a score (Score) representing an integrity of the training data set 109 can be computed as follows:

$$\text{Score} = W_{Change}\sum_i \frac{C_i}{\text{N\_Samples}}\cdot f_i + W_{Outliers}\sum_i \frac{L_i}{C_i}. \quad \text{(Eq. 1)}$$

In Eq. 1, $$\frac{C_i}{\text{N\_Samples}}$$

represents a ratio or of the count of changes made to feature i to the total quantity of training samples (N_Samples) in the input collection of training samples. This ratio $$\left(\frac{C_i}{\text{N\_Samples}}\right)$$

is referred to as a "change ratio."

Each change ratio $$\left(\frac{C_i}{\text{N\_Samples}}\right)$$

is multiplied by a factor $f_i$ computed according to the value of $$\frac{C_i}{\text{N\_Samples}},$$

such as according to Table 1 below. Effectively, the factors are used to scale the quantities of changes ($C_i$) made to the respective features to produce scaled values. These scaled values are then summed in the first expression $$\left(W_{Change}\sum_i \frac{C_i}{\text{N\_Samples}}\cdot f_i\right)$$

of Eq. 1. The factor $f_i$ is used to detect smaller quantities of changes of the feature i in the input collection of training samples, by preventing large counts (i.e., large values of $C_i$) from dominating the computation of Score.

TABLE 1

| Start | End | Factor |
|---|---|---|
| 0 | 0.04 | 10 |
| 0.04 | 0.1 | 5 |
| 0.1 | 0.2 | 2 |
| 0.2 | 0.3 | 1 |
| 0.3 | 1 | 0.5 |

According to Table 1, if $$\frac{C_i}{\text{N\_Samples}}$$

falls in the range starting at a value greater than 0 and ending at 0.04, the factor $f_i$ is set to 10. If $$\frac{C_i}{\text{N\_Samples}}$$

falls in the range starting at a value greater than 0.04 and ending at 0.1, the factor $f_i$ is set to 5. If $$\frac{C_i}{\text{N\_Samples}}$$

falls in the range starting at a value greater than 0.1 and ending at 0.2, the factor $f_i$ is set to 2. If $$\frac{C_i}{N\_Samples}$$

falls in the range staring at a value greater than 0.2 and ending at 0.3, the factor $f_i$ is set to 1. If $$\frac{C_i}{N\_Samples}$$

falls in the range starting at a value greater than 0.3 and ending at 1, the factor $f_i$ is set to 0.5. Generally, the smaller the value of $$\frac{C_i}{N\_Samples},$$

the larger the value of the factor $f_i$.

Although example ranges and respective factor values are provided in Table 1, in other examples, other factor values can be assigned for different ranges of $$\frac{C_i}{N\_Samples}.$$

In Eq. 1, the first expression $$\left(W_{Change}\sum_i \frac{C_i}{N\_Samples}\cdot f_i\right)$$

computes a sum of the product of $$\frac{C_i}{N\_Samples}$$

and $f_i$. In the first expression, the sum is weighted by a coefficient $W_{change}$, which is assigned a specified constant value. Generally, the value produced by the first expression of Eq. 1 represents the contribution of quantities of changes made to respective features of the input collection of training samples to the score (Score).

In Eq. 1, the second expression $$\left(W_{Outliers}\sum_i \frac{L_i}{C_i}\right)$$

computes a sum of $$\frac{L_i}{C_i}$$

(the ratio of a quantity of outliers ($L_i$) of feature i to the count of changes ($C_i$) of feature i). In this second expression, the sum is weighted by a coefficient $W_{outliers}$, which is assigned a specified constant value that may be the same as or different from $W_{change}$. Generally, the value produced by the second expression of Eq. 1 represents the contribution of quantities of outliers of the respective features of the input collection of training samples to the score (Score).

The relative values of the coefficient $W_{change}$ and the coefficient $W_{outliers}$ determine which of the first expression or second expression is given greater weight in the computation of Score.

In other examples, the first expression and/or the second expression for computing Score can use other types of aggregations besides a sum. More generally, the first expression can calculate a first aggregate value based on a first aggregation of the quantities of changes ($C_i$) made to the respective features, and the second expression can calculate a second aggregate value based on a second aggregation of the quantities of outliers ($L_i$). An "aggregation" of quantities can refer to a sum, an average, a mean, or any other type of mathematical aggregation.

The training data poisoning detection engine 114 compares Score to a specified threshold. Generally, in some examples, a higher value of Score indicates a greater likelihood of poisoning of the training data set 109. If Score exceeds the specified threshold, then that indicates potential poisoning of the training data set 109 has occurred. As a result, the training data poisoning detection engine 114 can issue the poison alert 130.

In other examples, depending on the formula used to compute Score, a lower value of Score indicates a greater likelihood of poisoning of the training data set 109. In such latter examples, the training data poisoning detection engine 114 can issue the poison alert 130 if Score falls below a specified threshold.

Figure 3:
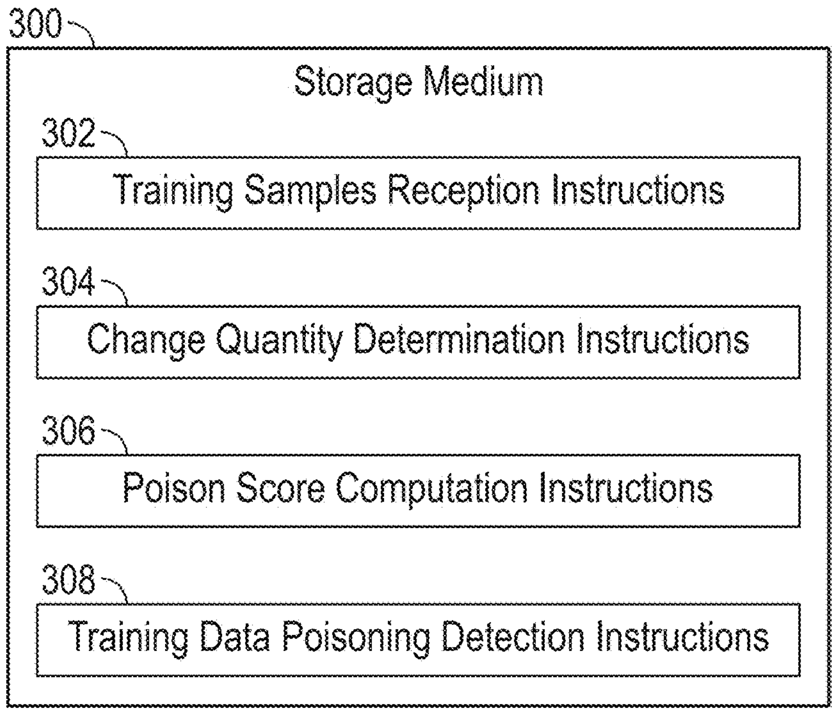
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system includes one or more computers.

The machine-readable instructions include training samples reception instructions 302 to receive a plurality of training samples of a training data set for a machine learning model, where each training sample of the plurality of training samples includes a plurality of features. The plurality of training samples can include replicated training samples replicated by a data replication manager (e.g., 112 in FIG. 1).

The machine-readable instructions include change quantity determination instructions 304 to determine quantities of changes made to respective features of the plurality of features. For example, the quantities of changes are represented by counts of the counters 222A to 222E of FIG. 2.

The machine-readable instructions include poison score computation instructions 306 to compute a score representing an integrity of the training data set based on the quantities of changes. The score can be computed according to Eq. 1 or any other formula.

The machine-readable instructions include training data poisoning detection instructions 308 to detect poisoning of the training data set based on the score. For example, the machine-readable instructions can determine whether the score has a specified relationship to a threshold (e.g., exceeds the threshold or falls below the threshold). If the score has the specified relationship to the threshold, the machine-readable instructions can issue a poison alert (e.g., 130 in FIG. 1.).

In some examples, the machine-readable instructions can further determine quantities of outliers in values of the respective features. The score is further based on the quantities of outliers. An outlier includes a value of a feature that is outside a specified distribution of values of the feature.

In some examples, the computing of the score includes calculating a first aggregate value based on a first aggregation of the quantities of changes made to the respective features, and calculating a second aggregate value based on a second aggregation of the quantities of outliers. An example of the first aggregation is provided by the first expression of Eq. 1, and an example of the second aggregation is provided by the second expression of Eq. 1.

In some examples, the first aggregate value is weighted using a first coefficient, and the second aggregate value is weighted using a second coefficient.

In some examples, the first aggregation of the quantities of changes made to the respective features includes scaling the quantities of changes made to the respective features to produce scaled values, and aggregating the scaled values (such as according to the first expression of Eq. 1).

In some examples, the scaling of the quantities of changes made to the respective features includes dividing the quantities of changes made to the respective features by a total quantity of the plurality of training samples (e.g., N_Samples).

In some examples, the scaling of the quantities of changes made to the respective features includes assigning factors (e.g., $f_i$) to the respective features, and combining the factors with the quantities of changes made to the respective features. A first factor of the factors is based on which range of a plurality of ranges of values a first quantity of changes made to a first feature is associated with. An example of the plurality of ranges includes the ranges of change ratios included in Table 1 above.

In some examples, the machine-readable instructions can calculate a change ratio for the first feature based on dividing the first quantity of changes by a total quantity of the plurality of training samples. The first factor is based on which range of the plurality of ranges of values the change ratio for the first feature falls into.

In some examples, the machine-readable instructions can assign a higher value to the first factor than a value of a second factor for a second feature based on the first quantity of changes made to the first feature being less than a second quantity of changes made to the second feature.

In some examples, the machine-readable instructions can identify a given feature of the plurality of features for which a quantity of changes made to the given feature exceeds a threshold. The threshold can be a value equal to the total quantity of the plurality of training samples. Alternatively, this threshold can be a value corresponding to a percentage of the total quantity of the plurality of training samples. The quantity of changes made to the first feature is excluded from use in computing the score based on identifying that the quantity of changes made to the first feature exceeds the threshold.

In some examples, the plurality of training samples is included in replicated training data provided by a data replication manager (e.g., 112 in FIG. 1) that replicates data writes to a storage system. The data writes are replicated to a backup storage system (e.g., 116 in FIG. 1).

In some examples, the machine-readable instructions can identify a time point at which the poisoning of the training data set is detected, and produce, from the replicated training data, an uncorrupted version of the training data set based on the identified time point.

In some examples, the producing of the uncorrupted version of the training data set includes selecting a checkpoint from a plurality of checkpoints (e.g., 120A to 120B) in the replicated training data. The plurality of checkpoints includes different versions of the training data set at respective different time points.

Figure 4:
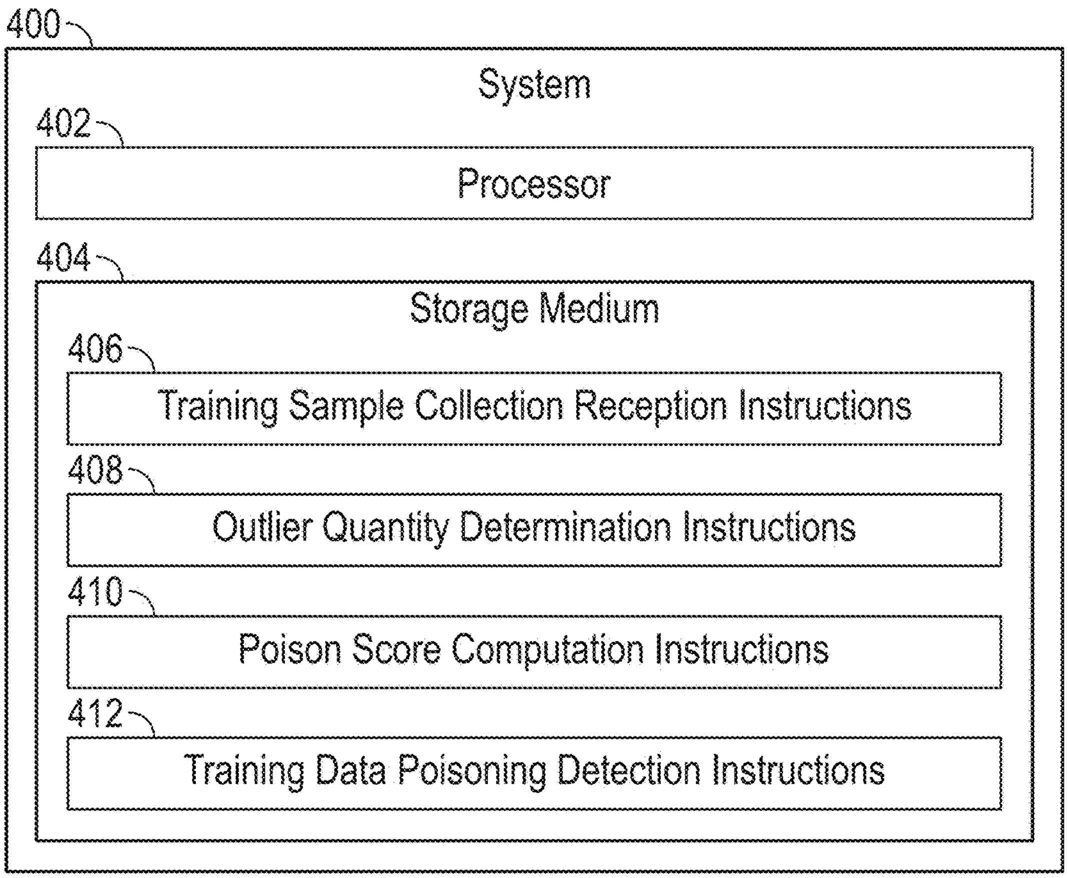
FIG. 4 is a block diagram of a system according to some examples.

FIG. 4 is a block diagram of a system 400 according to some examples. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform certain tasks. Machine-readable instructions executable on a hardware processor can refer to the instructions executable on a single hardware processor or the instructions executable on multiple hardware processors.

The machine-readable instructions in the storage medium 404 include training sample collection reception instructions 406 to receive an input collection of training samples for a training data set, the training data set used for training a machine learning model. Each training sample of the input collection of training samples comprises a plurality of features.

The machine-readable instructions in the storage medium 404 include outlier quantity determination instructions 408 to determine quantities of outliers in values of respective features of the plurality of features.

The machine-readable instructions in the storage medium 404 include poison score computation instructions 410 to compute a score representing an integrity of the training data set based on the quantities. An example of the score is computed according to Eq. 1.

The machine-readable instructions in the storage medium 404 include training data poisoning detection instructions 412 to detect poisoning of the training data set based on the score. If poisoning of the training data set is detected, the machine-readable instructions can issue a poison alert.

In some examples, the machine-readable instructions further determine quantities of changes made to respective features of the plurality of features, where the score is further based on the quantities of changes.

Figure 5:
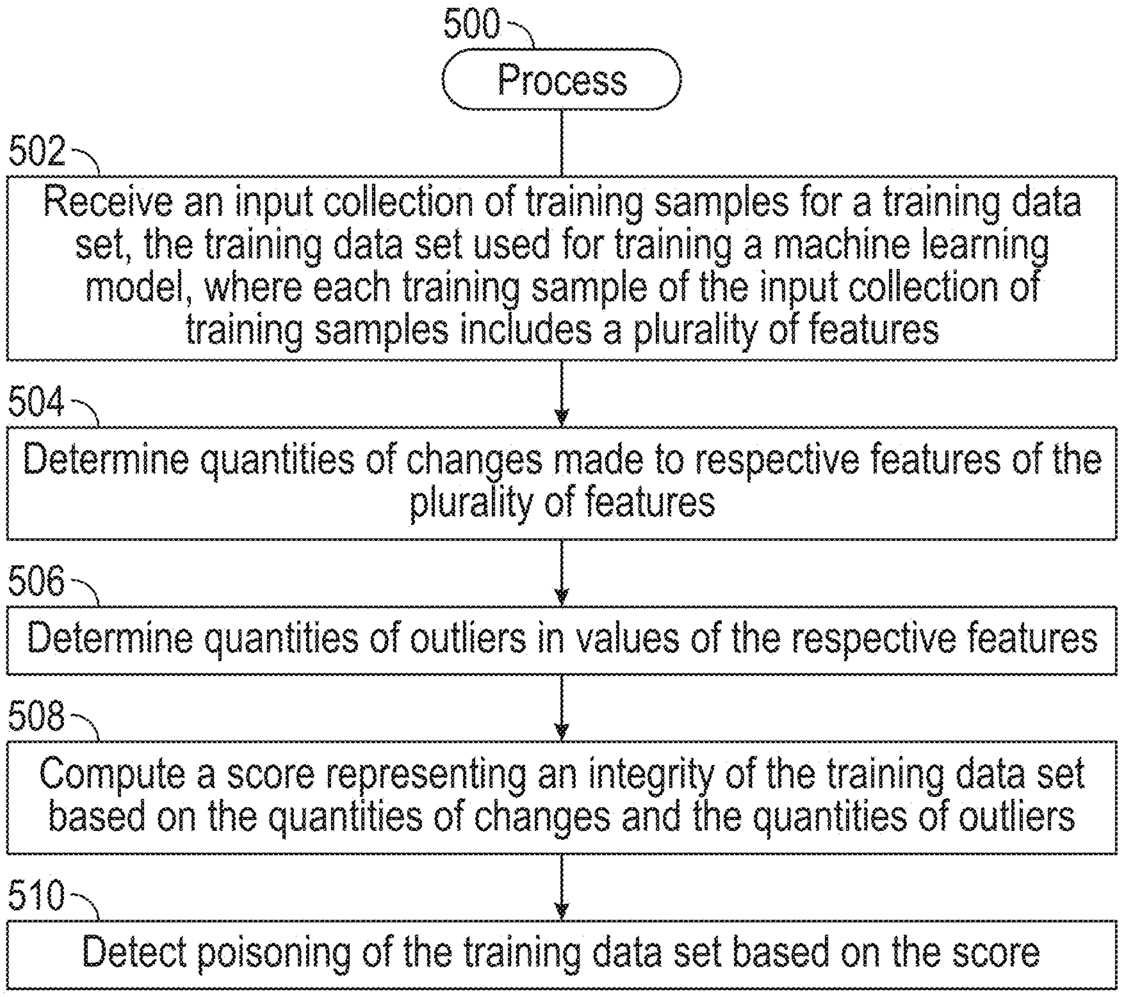
FIG. 5 is a flow diagram of a process according to some examples.

FIG. 5 is a flow diagram of a process 500 according to some examples. The process 500 may be performed by the training data poisoning detection engine 114 of FIG. 1, for example.

The process 500 includes receiving (at 502) an input collection of training samples for a training data set, the training data set used for training a machine learning model, where each training sample of the input collection of training samples includes a plurality of features. The input collection of training samples can include replicated training samples provided by a data replication manager. The input collection of training samples can include training samples within a moving time window that ends at a current time.

The process 500 includes determining (at 504) quantities of changes made to respective features of the plurality of features. The quantities of changes can be provided by respective counters that counts how many changes have been made to the respective features.

The process 500 includes determining (at 506) quantities of outliers in values of the respective features. The process 500 includes computing (at 508) a score representing an integrity of the training data set based on the quantities of changes and the quantities of outliers.

The process 500 includes detecting (at 510) poisoning of the training data set based on the score, such as by comparing the score to a threshold.

Using techniques or mechanisms according to some examples of the present disclosure, poisoned training data sets for machine learning models can be detected and remediation actions taken. As a result, the integrity of an Al system that uses a machine learning model can be protected. In some examples, by using replicated training data provided by a data replication manager, the training data poisoning detection can be performed in real-time and a timely alert can be issued.

A "storage device" can refer to a disk-based storage device, a solid state drive, or any other type of storage device.

A storage medium (e.g., 300 in FIG. 3 or 404 in FIG. 4) can include any or some combination of the following: a semiconductor memory device such as a DRAM or SRAM, an EPROM, an EEPROM, and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

receive a plurality of training samples of a training data set for a machine learning model, wherein each training sample of the plurality of training samples comprises a plurality of features, the plurality of training samples is included in replicated training data provided by a data replication manager that replicates data writes to a storage system, and the data writes are replicated to a persistent memory;

determine quantities of changes made to respective features of the plurality of features;

compute a score representing an integrity of the training data set based on the quantities;

detect poisoning of the training data set based on the score;

identify a time point at which the poisoning of the training data set is detected; and produce, from the replicated training data, an uncorrupted version of the training data set based on the identified time point.

2. The non-transitory machine-readable storage medium of claim 1, wherein the producing of the uncorrupted version of the training data set comprises:

selecting a checkpoint from a plurality of checkpoints in the replicated training data, the plurality of checkpoints comprising different versions of the training data set at respective different time points.

3. The non-transitory machine-readable storage medium of claim 1, wherein the instructions upon execution cause the system to:

determine quantities of outliers in values of the respective features, wherein the score is further based on the quantities of outliers.

4. The non-transitory machine-readable storage medium of claim 3, wherein an outlier comprises a value of a feature that is outside a specified distribution of values of the feature.

5. The non-transitory machine-readable storage medium of claim 3, wherein the computing of the score comprises:

calculating a first aggregate value based on a first aggregation of the quantities of changes made to the respective features, and calculating a second aggregate value based on a second aggregation of the quantities of outliers.

6. The non-transitory machine-readable storage medium of claim 5, wherein the first aggregation of the quantities of changes made to the respective features comprises scaling the quantities of changes made to the respective features to produce scaled values, and aggregating the scaled values.

7. The non-transitory machine-readable storage medium of claim 6, wherein the scaling of the quantities of changes made to the respective features comprises dividing the quantities of changes made to the respective features by a total quantity of the plurality of training samples.

8. The non-transitory machine-readable storage medium of claim 6, wherein the scaling of the quantities of changes made to the respective features comprises assigning factors to the respective features, and combining the factors with the quantities of changes made to the respective features, wherein a first factor of the factors is based on which range of a plurality of ranges of values a first quantity of changes made to a first feature is associated with.

9. The non-transitory machine-readable storage medium of claim 8, wherein the instructions upon execution cause the system to:

calculate a change ratio for the first feature based on dividing the first quantity of changes by a total quantity of the plurality of training samples, wherein the first factor is based on which range of the plurality of ranges of values the change ratio for the first feature falls into.

10. The non-transitory machine-readable storage medium of claim 8, wherein the instructions upon execution cause the system to:

assign a higher value to the first factor than a value of a second factor for a second feature based on the first quantity of changes made to the first feature being less than a second quantity of changes made to the second feature.

11. The non-transitory machine-readable storage medium of claim 1, wherein the instructions upon execution cause the system to:

identify a first feature of the plurality of features for which a quantity of changes made to the first feature exceeds a threshold, wherein the quantity of changes made to the first feature is excluded from use in computing the score based on identifying that the quantity of changes made to the first feature exceeds the threshold.

12. A system comprising:

a processor; and a non-transitory storage medium storing instructions executable on the processor to:

receive an input collection of training samples for a training data set, the training data set used for training a machine learning model, wherein each training sample of the input collection of training samples comprises a plurality of features, and the training samples are included in replicated training data provided by a data replication manager that replicates data writes targeting a storage system to a persistent memory;

determine quantities of outliers in values of respective features of the plurality of features;

compute a score representing an integrity of the training data set based on the quantities;

detect poisoning of the training data set based on the score;

identify a time point at which the poisoning of the training data set is detected; and produce, from the replicated training data, an uncorrupted version of the training data set based on the identified time point.

13. The system of claim 12, wherein the instructions are executable on the processor to:

determine quantities of changes made to respective features of the plurality of features, wherein the score is further based on the quantities of changes.

14. The system of claim 12, wherein the computing of the score comprises:

calculating a first aggregate value based on a first aggregation of the quantities of changes made to the respective features, and calculating a second aggregate value based on a second aggregation of the quantities of outliers.

15. The system of claim 14, wherein the computing of the score comprises:

weighting the first aggregate value using a first coefficient, and weighting the second aggregate value using a second coefficient.

16. The system of claim 12, wherein the detecting of the poisoning of the training data set comprises comparing the score to a specified threshold.

17. A method comprising:

receiving an input collection of training samples for a training data set, the training data set used for training a machine learning model, wherein each training sample of the input collection of training samples comprises a plurality of features, and the training samples are included in replicated training data provided by a data replication manager that replicates data writes targeting a storage system to a persistent memory;

determining, by a system comprising a hardware processor, quantities of changes made to respective features of the plurality of features;

determining, by the system, quantities of outliers in values of the respective features;

computing, by the system, a score representing an integrity of the training data set based on the quantities of changes and the quantities of outliers;

detecting, by the system, poisoning of the training data set based on the score;

identifying, by the system, a time point at which the poisoning of the training data set is detected; and producing, by the system from the replicated training data, an uncorrupted version of the training data set based on the identified time point.

18. The method of claim 17, further comprising:

identifying a first feature of the plurality of features for which a quantity of changes made to the first feature exceeds a threshold, wherein the quantity of changes made to the first feature is excluded from use in computing the score based on identifying that the quantity of changes made to the first feature exceeds the threshold.

* * * * *